United States Patent [19]

Koch

[11] Patent Number: 4,732,587
[45] Date of Patent: Mar. 22, 1988

[54] DEVICE FOR BREAKING DOWN A MIXTURE

[75] Inventor: Jochim Koch, Hollenbek, Fed. Rep. of Germany

[73] Assignee: Drägerwerk AG, Fed. Rep. of Germany

[21] Appl. No.: 607,819

[22] Filed: May 7, 1984

Related U.S. Application Data

[63] Continuation of Ser. No. 445,842, Nov. 30, 1982, abandoned.

[30] Foreign Application Priority Data

Jan. 13, 1982 [DE] Fed. Rep. of Germany ....... 3200679

[51] Int. Cl.$^4$ .............................................. B01D 53/04
[52] U.S. Cl. ......................................... 55/162; 55/163; 55/179; 55/389; 55/274
[58] Field of Search .................. 55/161–163, 55/179, 180, 389

[56] References Cited

U.S. PATENT DOCUMENTS

| | | | |
|---|---|---|---|
| 4,165,972 | 8/1979 | Iles et al. | 55/179 X |
| 4,197,096 | 4/1980 | Sebastian et al. | 55/163 |
| 4,306,889 | 12/1981 | Kruger et al. | 55/179 X |
| 4,322,223 | 3/1982 | Christel, Jr. | 55/179 X |
| 4,349,357 | 9/1982 | Russell | 55/179 X |
| 4,351,649 | 9/1982 | Owens et al. | 55/179 X |

FOREIGN PATENT DOCUMENTS 2915336 10/1980 Fed. Rep. of Germany ........ 55/179
2066693 7/1981 United Kingdom ................. 55/163

Primary Examiner—Robert Spitzer
Attorney, Agent, or Firm—McGlew and Tuttle

[57] ABSTRACT

Devices for breaking down a gas mixture by means of an absorbent permit the production of an enriched product, e.g. oxygen for technical processes or for ventilation. During the operation, the device is switched periodically between two operating stages, in which the gas mixture is fed to one of two tanks with absorbent, while the other is regenerated at the same time. The charging of the absorbent becomes clear with the pressure rise in the gas mixture in front of the tanks. As a characteristic curve is considered the hyperbola $$p = K/T$$

with
K as a system constant
p as the optimum adsorption pressure, and
T as the optimum adsorption time.

In the control, a timing unit releases a multiplier in which the value K/T is constantly formed, which corresponds then to the respective time related optimum adsorption pressure. In a comparator, this signal is compared with the signal of a sensor in the gas mixture in front of the tanks. In case of agreements, the tanks are switched on the characteristic curve. An alarm device indicates troubles of the device.

3 Claims, 3 Drawing Figures

DEVICE FOR BREAKING DOWN A MIXTURE

This is a continuation of application Ser. No. 445,842 filed Nov. 30, 1982 now abandoned.

FIELD AND BACKGROUND OF THE INVENTION

This invention relates in general to control devices and in particular to a new and useful device for breaking down a mixture.

Devices for breaking down mixtures by means of an adsorbent permit the production of an enriched product, e.g. oxygen for technical processes or for the ventilation of many from the surrounding atmosphere, and make it independent of the storage and re-supply organization for this gas.

A known control for a device for breaking down a mixture, particularly for an oxygen separator, permits the continuous delivery of an oxygen-rich gas as a product upon the supply of compressed air. The device is switched periodically by a pneumatic control between two operating stages in which the compressed air is fed to one of the tanks contained in the device with adsorbent, and the other tank is at the same time regenerated and vice versa. Switching criteria are the attainment of a certain pressure in the tank supplied with compressed air, which indicates that it is exhausted. The release of the control for ending the respective operating state is effected over a push button when the given limit pressure in the mixture supply has been attained. Then a pressure equilibrium is established between the two tanks. After this is achieved, the control is released at the start of the following operating state by a pressure equalizing switch which is connected at the same time to both tanks.

Specifically the mixture to be broken down is supplied from the compressed air source over a mixture supply. The mixture supply can be connected by an inlet valve over the control with the inlet of the first tank and of the second tank. The outlet of the tanks can be connected over an outlet valve with the atmosphere. The inlet valve of the first tank and the outlet valve of the second tank are combined for control to a first valve arrangement and connected to the control. Likewise, the inlet valve of the second tank and the outlet valve of the first tank are combined to a valve arrangement and connected to the control. The outlets of the first tank and of the second tank are connected with each other over a choke and over a pressure reducer to the line to the load.

The above-described system does not take into consideration tolerances between the tanks, as they result, i.e. from the filling, and then also by fluctuations in the volume current. Neither the adsorbent pressure alone, nor the adsorption time, as it results from the volume current resulting from the pressure until the adsorbent is exhausted, determine the optimum utilization and the end of the absorption cycle (German OS No. 29 51 626).

SUMMARY OF THE INVENTION

The invention provides a control for a device for breaking down a mixture where the adsorption beds are optimally utilized.

In accordance with the invention, a device is provided for breaking down a mixture, particularly an oxygen separator which includes first and second tanks which are filled with an absorbent of one of the components of the mixture and which are interconnected through two separate valve arrangements, one of which permits a first operating state and an unhindered supply of a compressed mixture to the first tank and the guidance of a part of the enriched mixture to the second tank so that the absorbed component is flushed out of this tank and a second valve arrangement in which the second tank is filled with the absorbent and the first tank is flushed of the previously absorbed component. The arrangement includes the mixture storage connected to the tanks and a sensor connected to the mixture storage and the two tanks and including the timing unit, a multiplier and a comparator connected to a flip-flop along with a window comparator and an alarm device and to the first and second valve arrangements for shifting from one operating stage of the valve arrangement to the other when the signal of the sensor connected to the mixture supply is identical with the value $K/T_i$ constantly formed in a multipler from the system constant K and time of a timing unit, and contains the value for T minimum and T maximum given in the window comparator which receives the signals of the timing unit and is connected to the timing unit with the output of the comparator and are reset by the comparator.

The secured switching on the optimum characteristic curve A does not provide any possibility that the pressure building up in the course of the adsorption in front of the respective adsorption bed will be outside the optimum hyperbolic point K/T. In the control, the timing unit releases the multiplier, in which the K/T is constantly formed with the system constant K, which then corresponds to the respective time-related optimum absorption end pressure. In the comparator, the latter is compared with the signal of the sensor. In case of agreement, the tank is switched.

The alarm device in the control unit secures by the T-minimum and T-maximum times given in the window comparator that the function of the switching took place in the provided time periods. This way even failures, e.g. in the supply of the gas mixture are recognized. In this case the maximum admissable time T-maximum is exceeded due to a lack of rising pressure in front of the adsorption bed.

Accordingly, it is an object of the invention to provide a device for breaking down a mixture in which the operating is carried out by separate control valve arrangements connected to two separate tanks which arrangement may be switched in accordance with a sensor connected to a mixture storage of the components of the mixture to be broken down.

A further object of the invention is to provide a device for breaking down a mixture which is simple in design, rugged in construction and economical to manufacure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
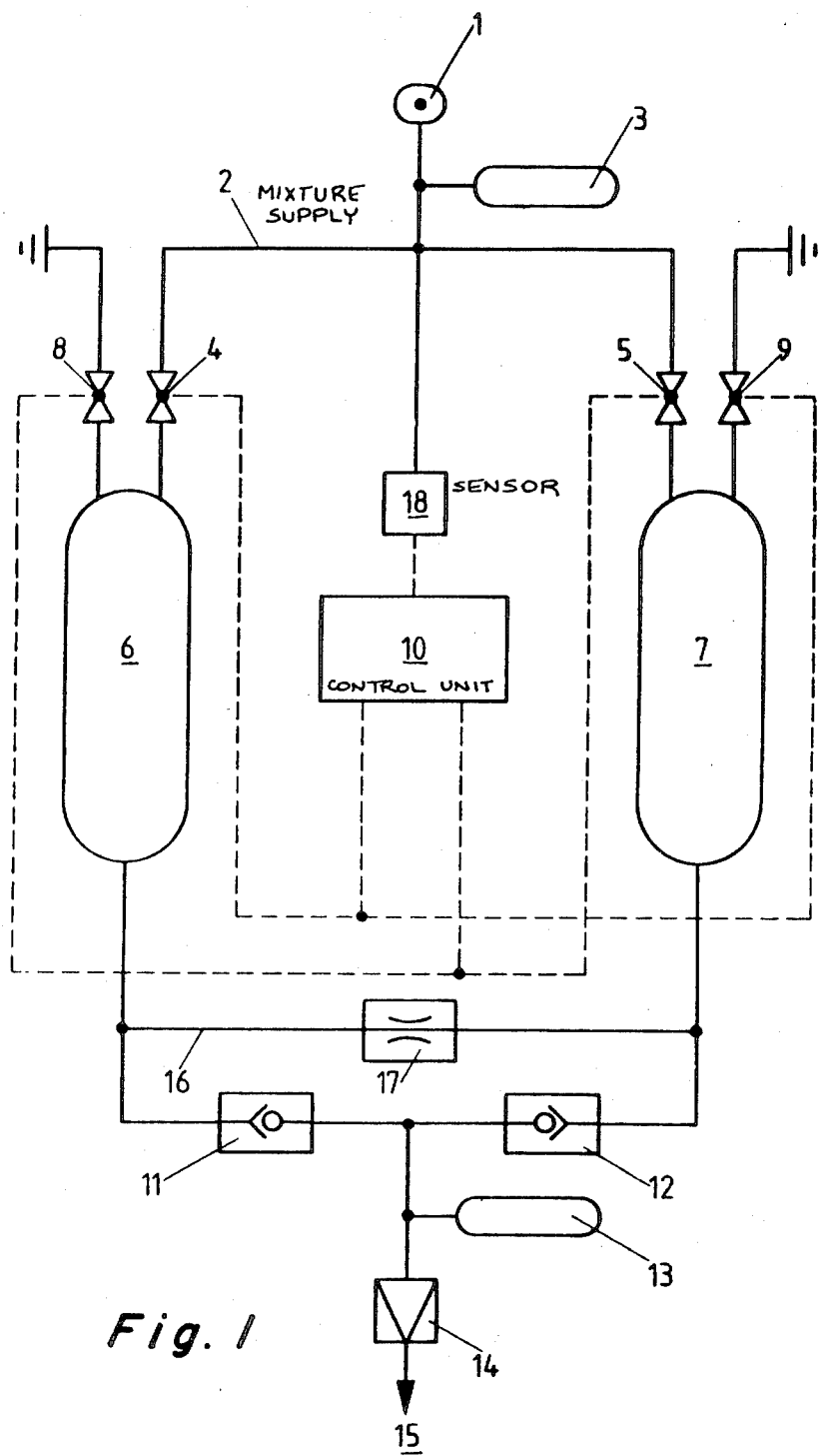
FIG. 1 is a schematic diagram of the control unit and the sensor and controlling device constructed in accordance with the invention.
Figure 2:
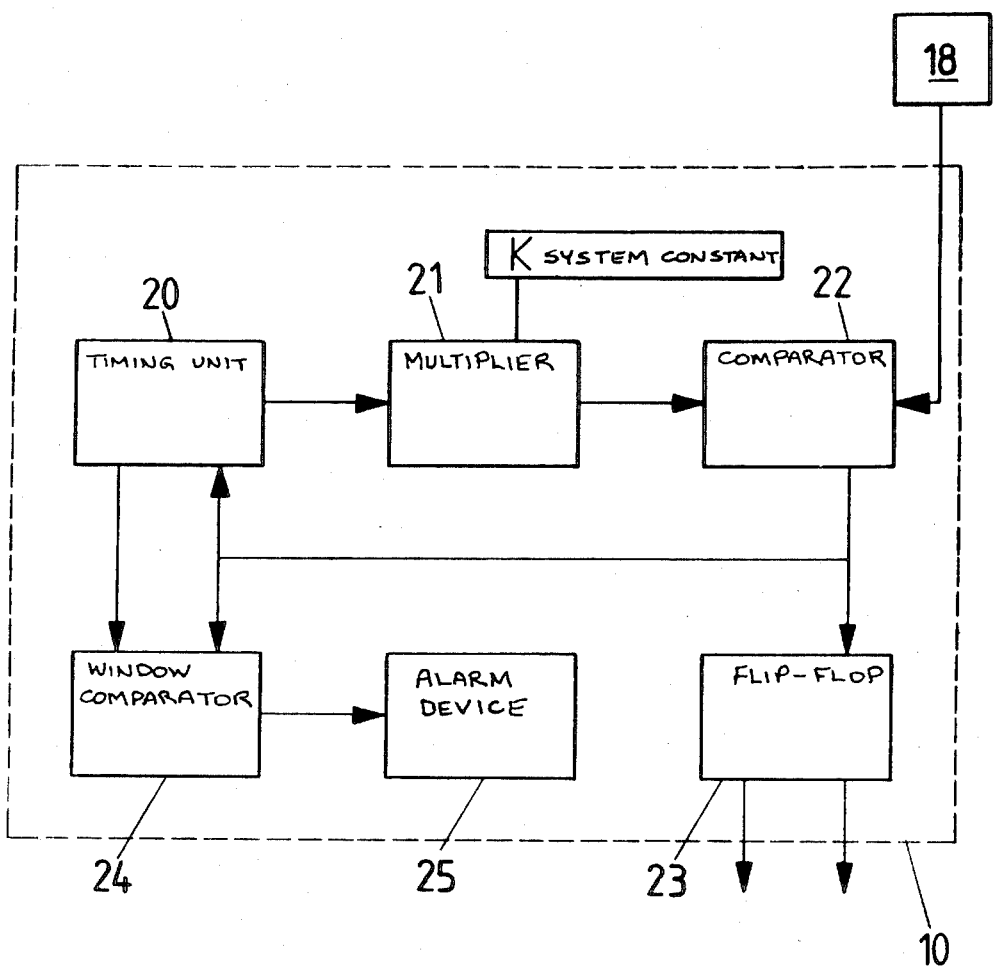
FIG. 2 is a diagrammatical showing of the control unit of the device.

The device for breaking down a mixture, here an oxygen separator, contains two tanks 6,7 filled with an absorbent that is selective for the component to be removed. The mixture to be broken down, compressed air, is fed from a compressed air source 1 over a mixture supply 2 with the connected mixture storage 3. Mixture supply 2 can be connected over an inlet valve 4 and/or 5 with the input of the first tank 6 and of the second tank 7. Tanks 6 and 7 are filled with an adsorbent for nitrogen. The input of tanks 6 and 7 can be connected with the atmosphere over an outlet valve 8 and 9. Inlet valve 4 of the first tank 6 and outlet valve 9 of the second tank 7 are combined for control to a first valve arrangement and connected to a control unit 10. Likewise, the inlet valve 5 of the second tank 7 and outlet valve 8 of the first tank 6 are combined to a second valve arrangement and connected to control unit 10. The outputs of the first tank 6 and of the second tank 7 are connected over a non-return valve 11, 12 with a product storage 14, which is adjoined over a pressure reducer 13 by a line 15 to the load. In addition, the outlets of tanks 6,7 are connected with each other over a flushing line 16 with a choke 17. A sensor 18 is connected with the mixture supply 2 and gives off a signal to control unit 10 which corresponds to the pressure in mixture supply 2.

Figure 3:
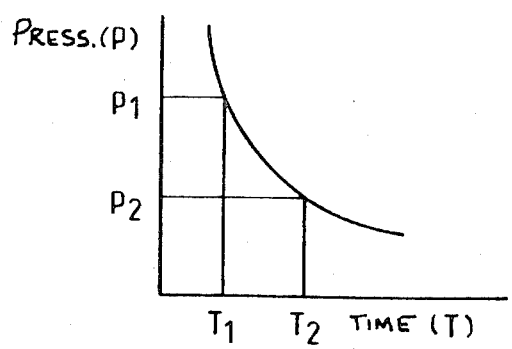
FIG. 3 is a diagram of the characteristic curve A.

The switching within the control cycles is based on the finding that the pressure switching must be effected quasi on an optimum characteristic curve A. This curve A (FIG. 3) is formed from the dependence of switching pressure p with the corresponding switching time $T_i$. For characteristic curve A, the following relation always applies:

$$p = K/T$$

with
K as a system constant
p as the optimum adsorption pressure and
T as the optimum adsorbent.

Characteristic curve A indicates at any time an optimum pressure $p_i$.

Control unit 10 contains a timing unit 20, from the signal of which the value $K/T_i$ is constantly formed in a multiplier 21 with the system constant K.

It is compared in a comparator 22 with the applied signal of sensor 18 which corresponds to the instantaneous pressure. In case of agreement with K/T, whence when it lies on characteristic curve A, it must be switched.

Comparator 22 gives off an output signal and thus releases a flip-flop 23 which switches the outputs of control unit 10 and thus the valve arrangements. Parallel with this course, the signal of timing unit 20 is received in a window comparator 24 with given values for the maximum and minimum time. Window comparator 24 and timing unit 20 are also connected with the output of comparator 22. Its output signal sets back window comparator 24, as well as timing unit 20, and determines thus at the same time whether the output signal was emitted within the set time limits. Above the maximum time or below the minimum time, an alarm is released in n alarm device 25.

In operation, valves 4, 9 of the first valve arrangement are open in a first operating state, and valves 5, 8 of the second valve arrangement are closed. The supplied compressed air arrives over inlet valve 4 in the first tank 6. There the nitrogen portion is adsorbed by the adsorbent. A product enriched with oxygen leaves the first tank 6 and arrives over non-return valve 11 in product storage 13 and over pressure reducer 14 in line 15 to the load. At the same time a part of the enriched product flows over choke 17 into the second tank 7, flushing out the nitrogen adsorbed there over outlet valve 9 into the atmosphere. With progressing adsorption of nitrogen in the first tank 6, the pressure rises in the first tank 6 and in mixture supply 2. As soon as this pressure is identical with the optimum adsorption end pressure corresponding to the respective absorption time, control unit 10 closes valves 4, 9 of the first valve arrangement by releasing flip-flop 23 and completes the first operating state. At the same time control unit 10 opens valves 5,8 of the second valve arrangement. The second operating state thus starts, which correspond to the first operating state with the functions between tanks 6,7 interchanged. Its completion and the subsequent switch to the first operating stage also take place in the same sense as described above. The above-described processes repeat themselves in cyclical order.

While a specific embodiment of the invention has been shown and described in detail to illustrate the application of the principles of the invention, it will be understood that the invention may be embodied otherwise without departing from such principles.

What is claimed is:

1. A device for separating out a component of a mixture, comprising:
    a mixture supply (2) for supplying the mixture;
    a first inlet valve (4) and a second inlet valve (5) connected to said mixture supply for selectively passing and blocking the mixture;
    a first tank (6) having an inlet connected to said first inlet valve;
    a second tank (7) having an inlet connected to said second inlet valve;
    said first and second tanks having absorbent therein for selectively absorbing the one component from the mixture;
    a first outlet valve (8) connected to a first outlet of said first tank for discharging mixture from said first tank to flush the compound out of the absorbent of said first tank;
    a second outlet valve (9) connected to a first outlet of said second tank for discharging mixture from said second tank to flush the component out of the absorbent of said second tank;
    a pressure sensor (18) connected to said mixture supply for sensing the pressure (p) of said mixture supply;
    a flush line (16) connected only between second outlets of said first and second tanks;
    a choke (17) connected in said flush line for allowing, at all times, a restricted flow of mixture in said flush line, said flush line operating to supply mixture from one of said tanks to the other to flush said other tank;
    a first check valve (11) connected to said second outlet of said first tank for permitting passage of enriched mixture from said first tank;

a second check valve (12) connected to said second outlet of said second tank for permitting passage of enriched mixture from said second tank;

said first and second check valves having connected outlets connected to each other for discharging enriched mixture;

a pressure reducer (14) connected to said connected outlets but not to said flush line, for discharging enriched mixture from said connected outlets, said check valves preventing flow from said pressure reducer to said tanks; and control means (10) connected to said sensor (18), said control means including a first control pathway connected to said first inlet valve (4) and said second outlet valve (9) for permitting passage of mixture through said first inlet valve and said second outlet valve simultaneously, and a second control pathway connected to said second inlet valve (5) and said first outlet valve (8) for permitting passage of mixture through said second inlet valve and first outlet valve simultaneously, said control means including switching means connected to said first and second control pathways for switching between said first and second control pathways;

said switching means comprising a timing unit (20) for continuously establishing an optimum time (Ti) of operation of each of said first and second control pathways, a multiplier (21) connected to said timing unit for dividing a time constant (K) by said optimum time to produce an optimum switching signal (K/Ti), a comparator (22) connected to said multiplier and to said pressure sensor (18) for comparing the pressure (p) of said mixture supply to said optimum switching signal, and a flip-flop (23) connected to said first and second control pathways and to said comparator for switching between said first and second control pathways when said optimum switching signal is equal to the pressure of said mixing supply which then corresponds to an optimum pressure (Pi);

the mixture passing over said choke (17) in said flush line (16) from said second outlet of said first tank to said second outlet of said second tank to flush said second tank (7) while said flip-flop is switched to said first control pathway, and mixture passing over said choke (17) in said flush line (16) from said second outlet of said second tank to said second outlet of said first tank to flush said first tank (6) while said flip-flop is switched to said second control pathway.

2. A device according to claim 1, wherein said control unit includes a window comparator having maximum and minimum permissible values for said optimum time, said window comparator connected to said timing unit, and an alarm connected to said window comparator for activation when the optimum time is one of above the maximum time value and below the minimum time value.

3. A device according to claim 2, including a feedback line connected between an outlet of said first mentioned comparator and inlets of said timing unit and said window comparator for returning the optimum pressure value to said timing unit and said window comparator.

* * * * *